May 19, 1964

R. A. GARRISON ETAL 3,133,473

FLUID OPERATED BOOSTER VALVE

Filed Dec. 5, 1961

INVENTORS.
ROBERT A. GARRISON,
CHARLES H. SCHOELM,
By their Attorneys
HARRIS, KIECH, RUSSELL & KERN.

May 19, 1964 R. A. GARRISON ETAL 3,133,473
FLUID OPERATED BOOSTER VALVE
Filed Dec. 5, 1961 5 Sheets-Sheet 5

ROBERT A. GARRISON,
CHARLES H. SCHOELM,
INVENTORS.

BY THEIR ATTORNEYS

HARRIS, KIECH, RUSSELL & KERN.

3,133,473
FLUID OPERATED BOOSTER VALVE
Robert A. Garrison, 2645 Wallingford Road, San Marino, Calif., and Charles F. Schoelm, Long Beach, Calif.; said Schoelm assignor to said Garrison
Filed Dec. 5, 1961, Ser. No. 157,158
7 Claims. (Cl. 91—372)

This application is a continuation-in-part of our copending application Serial No. 98,095, filed March 24, 1961, and now Patent No. 3,053,052, issued September 11, 1962.

The present invention relates in general to a fluid operated booster the output of which is delivered to an apparatus requiring an amplified actuating force and, more particularly, to a fluid operated booster which is also a valve capable of maintaining adequate and constant delivery of operating fluid to another, fluid operated apparatus.

As an example, the present invention finds particular utility when applied to such heavy vehicles of the general automotive type as trucks, tractors, motor graders, and the like, to apply an amplified disengaging force to the clutch of such a vehicle while at the same time making available an adequate and constant supply of operating fluid to the control valve of a power steering system with which the vehicle is equipped. For convenience, the invention will be considered herein in such an environment, but with no intention of limiting it specifically thereto.

In general, the invention contemplates, and a general object thereof is to provide, a fluid operated booster valve, for use with two apparatuses, e.g., a clutch and a steering system, at least one of which, e.g., the steering system, is also fluid operated, including: a housing providing a cylinder having input and output ends and having therein an inlet port connectible to a source of operating fluid, an outlet port connectible to the control valve of the fluid operated steering system, and a reservoir port connectible to a reservoir; concentric, relatively axially movable, input and output plungers axially movable in the cylinder, the input plunger being connected at the input end of the cylinder to a movable, operator actuated, input means; movable output means adjacent the output end of the cylinder and connectible to the clutch for applying the booster output to the clutch; and control means embodied in the input and output plungers and responsive to relative axial movement thereof for producing the booster output and for at the same time maintaining an adequate and continuous delivery of operating fluid to the control valve of the steering system so that the clutch and the steering system may be power operated simultaneously.

An important object of the invention is to provide a fluid operated booster valve of the foregoing nature wherein the booster output is produced by applying the operating fluid pressure in the inlet port directly to an annular actuating surface of the output plunger which faces axially of the cylinder in a direction opposite to the direction of the input force, the aforementioned movable output means being connected directly to the output plunger adjacent the output end of the cylinder. With this construction, the output plunger not only cooperates with the input plunger to provide the aforementioned control means, but also produces the booster output when the actuating surface mentioned is placed in fluid communication with the inlet port. Consequently, no auxiliary piston for producing the booster output is required, which is an important feature of the invention since it eliminates a major component.

More specific objects of the invention are to provide a control means embodied in the input and output plungers and responsive to relative axial movement thereof which includes first valve means for selectively connecting the aforementioned actuating surface of the output plunger in fluid communication with the reservoir port or with the inlet port, and which includes second valve means for controlling the restriction to flow of operating fluid from the inlet port to the outlet port, and thence to the control valve of the steering system, so as to control the pressure applied to the actuating surface of the output plunger, the second valve means controlling the restriction to flow of operating fluid therethrough in such a manner as to insure an adequate and continuous supply of operating fluid to the steering system at all times so that the clutch and the steering system can be power operated simultaneously.

Another object of the invention is to provide a fluid operated booster valve of the foregoing construction which operates as a relief valve for maintaining the operating fluid pressure applied to the output plunger substantially constant when the clutch is power operated, but which fully opens the second valve means controlling the restriction to flow of operating fluid from the inlet port to the outlet port when power operation of the steering system is demanded, thereby insuring an adequate supply of operating fluid to the steering system.

It might be pointed out at this juncture that in order to achieve the mode of operation hereinbefore outlined, it is necessary that the apparatus to which the booster output is applied be capable of overtraveling, i.e., traveling beyond a normal operating position. When the booster actuated apparatus is a clutch, as in the exemplary application of the invention elected for consideration herein, such overtraveling is inherent. When the booster actuated apparatus is one which is not inherently capable of overtraveling, it is necessary that a capacity for overtraveling be built thereinto, preferably with a suitable resilient means.

Another and important object of the invention is to provide a fluid operated booster valve having either a mechanical booster output, or a hydraulic booster output. In the former case, the hereinbefore-mentioned movable output means mechanically interconnects the output plunger and the apparatus to be actuated by the booster output. In the latter case, the output plunger includes a working piston which produces a working pressure in a fluid delivered to the apparatus to be booster actuated through a working port at the output end of the cylinder of the booster valve.

Still another important object is to provide mechanical-output boosters respectively capable of accepting a "push" input to produce a "push" output and of accepting a "pull" input to produce a "pull" output.

Other objects of the invention are to provide a fluid operated booster valve wherein the input plunger is within the output plunger, the latter being tubular, and to provide a booster valve which produces an operator feel. the latter is accomplished by applying to the input plunger part of the pressure force applied to the output plunger, the operator feel being substantially constant at all times because of the relief valve action of the booster valve.

Another object is to provide resilient means for biasing the input and output plungers axially toward the input end of the cylinder. In many applications of the invention, such as the clutch application hereinbefore outlined, the clutch engaging spring or springs inherently act to bias the output plunger toward the input end of the cylinder so that no resilient means for this purpose is necessary within the fluid operated booster valve itself.

The foregoing objects, advantages, features and results of the present invention, together with various other objects, advantages, features and results thereof which will be evident to those skilled in the fluid operated booster valve art in the light of this disclosure, may be achieved with the exemplary embodiments of the invention described in detail hereinafter and illustrated in the accompanying drawings, in which:

Booster Valve 10

Figure 1:
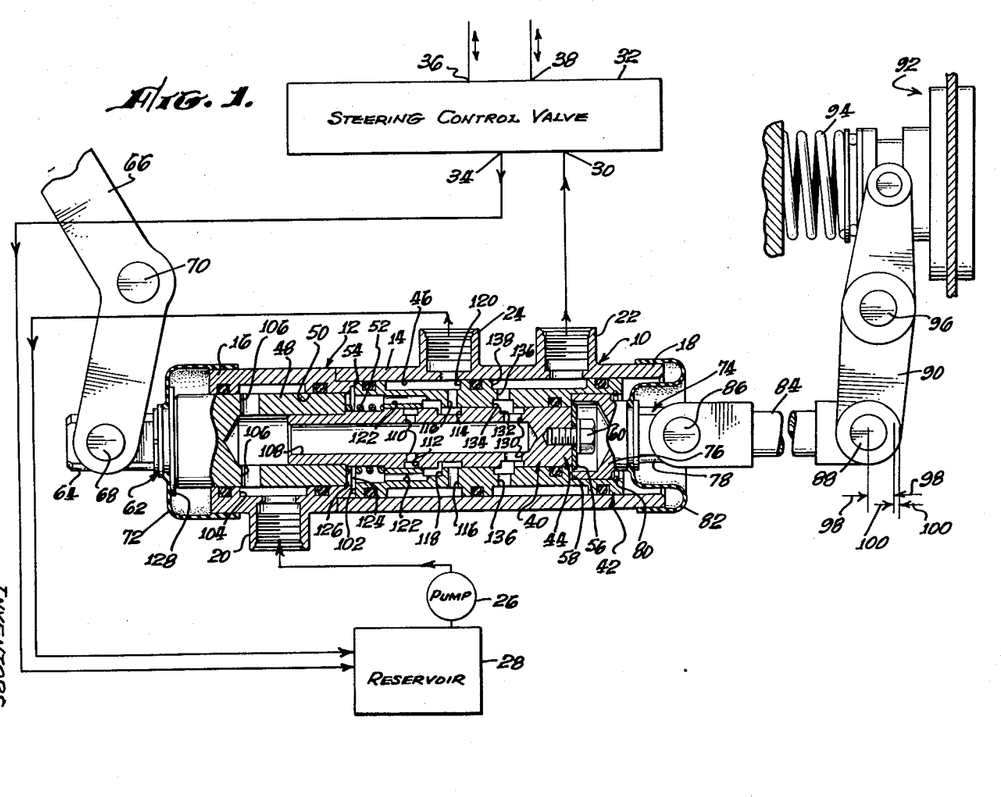
FIG. 1 is a partially diagrammatic view of a fluid operated clutch and steering system which incorporates the fluid operated booster valve of the invention, the latter being shown in longitudinal section.

Referring initially to FIG. 1 of the drawings, the embodiment of the fluid operated booster valve of the invention which is illustrated therein is designated generally by the numeral 10 and includes a housing 12 mountable on a suitable supporting structure in a manner not specifically shown. The housing 12 provides a cylinder 14 having input and output ends 16 and 18 and having therein an inlet port 20, an outlet or working port 22 and a reservoir port 24.

The inlet port 20 is connected to the outlet of a pump 26, which may be driven by the engine, not shown, of a truck, tractor, motor grader, or other similar vehicle, on which the booster valve 10 is installed. The inlet of the pump 26 is connected to a reservoir 28. The pump 26 and the reservoir 28 may be combined in a single unit, as is conventional in pumps for automotive-type power steering systems.

The outlet port 22 is connected to an inlet port 30 of a control valve 32 of a fluid operated power steering system, not completely shown, with which the vehicle is equipped. The control valve 32, which may be similar to those disclosed in Patents Nos. Re. 23,867, reissued September 14, 1954, and 2,824,447, issued February 25, 1958, to Robert A. Garrison, one of the inventors of the present invention, includes an outlet port 34 connected to the reservoir 28 and includes operating or working ports 36 and 38 respectively connected to opposite ends of a reciprocating-type, fluid operated, steering motor connected to the steerable wheels of the vehicle. The control valve 32 is of the open-center type so that the operating fluid entering it through the inlet port 30 circulates freely through the control valve, and back to the reservoir 28, when no steering is taking place. However, when the vehicle is steered in one direction or the other, the operating fluid flow entering the inlet port 30 is directed to one or the other of the working ports 36 and 38, the displaced operating fluid from the steering motor entering the control valve 32 through the other working port and being directed to the outlet port 34 leading back to the reservoir 28. Thus, the control valve 32 imposes no restriction to flow from the outlet port 22 of the booster valve 10 to the reservoir 28 when no steering is taking place, except for normal pressure drops in the control valve 32 and in the lines connecting it to the booster valve 10 and the reservoir 28.

The reservoir port 24 of the booster valve 10 is, as shown in FIG. 1 of the drawings, connected to the reservoir 28.

The fluid operated booster valve 10 includes concentric, relatively axially movable, input and output plungers 40 and 42 axially movable in the cylinder 14. The input plunger 40 includes a spool valve 44 disposed within the output plunger 42, the latter being an annular or sleeve-type piston which cooperates with the spool valve 44. The output plunger or piston 42 is reciprocable in a major-diameter portion 46 of the cylinder 14, and the input plunger 40 includes a piston 48 which is reciprocable in a minor-diameter portion 50 of the cylinder 14 and to which the spool valve 44 is rigidly connected. Interposed between and seated against the adjacent ends of the pistons 42 and 48 is a resilient means, preferably a compression coil spring 52 encircling the spool valve 44, for biasing the input plunger 40 toward the input end 16 of the cylinder 14. The output plunger or piston 42 is biased toward the input end 16 of the cylinder 14 in a manner to be described. Axial movement of the output piston 42 toward the input end 16 of the cylinder 14 is limited by engagement of the output piston with an annular shoulder 54 at the junction of the major-diameter and minor-diameter portions 46 and 50 of the cylinder. Axial movement of the input plunger 40 toward the input end 16 of the cylinder 14 is limited by engagement of an annular washer 56 on the spool valve 44 with an annular shoulder 58 on the output piston, the washer 56 being secured to the spool valve by a screw 60.

The piston 48 of the input plunger 40, in addition to forming part of the input plunger, constitutes a movable input means 62 of the booster valve 10. More particularly, the piston 48 is provided with an axially projecting stem 64 to which a clutch pedal 66 is pivotally connected at 68. The clutch pedal 66 is pivotally connected to the structure of the vehicle at 70. A flexible seal 72 interconnects the housing 12 and the input means 62.

At the output end 18 is an output means 74 comprising a member having a head 76 and an axially projecting stem 78. The head 76 of the output means 74 is telescoped into the output piston 42 and is seated against the annular shoulder 58 thereon, being retained by a snap ring 80. The output means 74 is connected to the housing 12 by a flexible seal 82 and the projecting stem 78 thereof is pivotally connected to one end of a link 84 at 86. The other end of the link 84 is pivotally connected, at 88, to one end of a lever 90 for disengaging a clutch, shown diagrammatically at 92, in opposition to the action of a clutch engaging spring 94, the lever 90 being pivotally mounted on the clutch housing, or the like, at 96. The clutch spring 94, in addition to performing its usual clutch engaging function, also acts through the lever 90, the link 84 and the output means 74 to bias the output piston 42, and thus, through the spring 52, the input plunger 40, toward the input end 16 of the cylinder 14.

Figure 2:
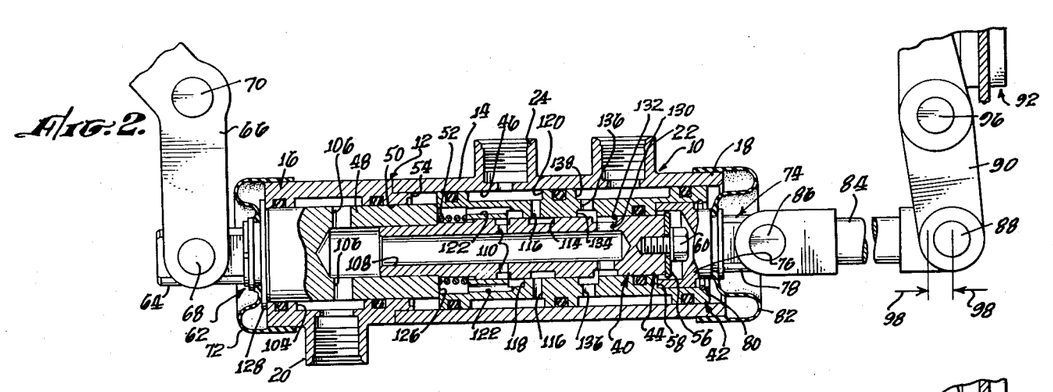
FIG. 2 is a longitudinal sectional view of the fluid operated booster valve of the invention similar to the longitudinal sectional view thereof appearing in FIG. 1, but showing a different set of operating conditions.
Figure 3:
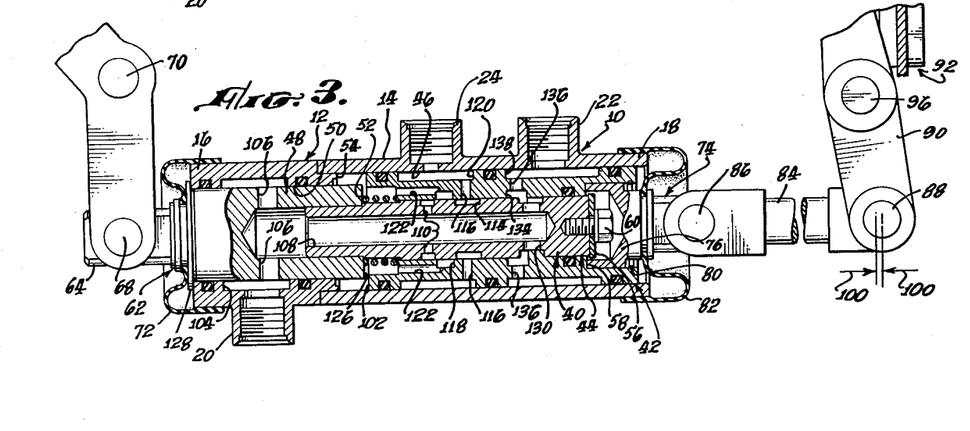
FIG. 3 is a longitudinal sectional view similar to that of FIG. 2, but showing still another set of operating conditions.

As previously indicated, and for a reason which will become apparent, it is essential that the fluid operated booster valve 10 of the invention be utilized to actuate an apparatus which is capable of overtraveling beyond a normal operating position, either inherently, or by building in a capacity to overtravel. In the case of the clutch 92, the overtraveling capacity is inherent. In FIGS. 1 to 3 of the drawings, the distance that the pivot point 88 moves in disengaging the clutch 92 is indicated by the dimensional arrows 98. However, the clutch 92 is capable of overtraveling beyond its disengaged position, the overtravel being indicated by the dimensional arrows 100.

Considering the output piston 42 and the spool valve 44 in more detail, these members act in concert in response to relative axial movement thereof to provide valve means for (a) selectively connecting an annular actuating surface 102 on the output piston 42, which actuating surface is located at the end of the output piston that is adjacent the input end 16 of the cylinder 14, in fluid communication with the inlet port 20 or the reservoir port 24, and for (b) controlling the restriction to flow of operating fluid from the pump 26 to the steering control valve 32 which is offered by the booster valve 10, or, more specifically, the restriction to flow of operating fluid through the booster valve 10 from its inlet port 20 to its outlet port 22.

Considering first the action of the output piston 42 and the spool valve 44 in selectively connecting the actuating surface 102 to the inlet port 20 and the reservoir port 24, the inlet port 20 communicates with a wide internal annular channel 104 in the minor-diameter portion 50 of the cylinder 14. In constant communication with the annular channel 104 are radial ports 106 in the piston 48 of the input plunger 40, the inner ends of these ports communicating with an axial passage 108 in the piston 48 and the spool valve 44. Communicating with the axial passage 108 intermediate the ends thereof are radial ports 110 communicating at their outer ends with an external annular groove 112 in the spool valve 44. Thus, operating fluid at the pressure prevailing in the inlet port 20 is always present in the annular groove 112.

Spaced axially from the annular groove 112 toward the output end 18 of the cylinder 14 is an external annular groove 114 in the spool valve 44. When the input plunger 40 and the output piston 52 are in the position shown in FIG. 1 of the drawings, which positions are their normal positions, the annular groove 114 bridges radial ports 116 and an internal annular groove 118 in the output piston 42. The radial ports 116 communicate at their outer ends with a wide external channel 120 in the output piston 42, which channel is constantly in fluid communication with the reservoir port 24. The annular groove 118 communicates through longitudinal passages 122 in the output piston 42 with the annular actuating surface 102 of the output piston. More accurately, the longitudinal passages 122 communicate with an annular chamber 124 which surrounds the spool valve 44 and one end of which is formed by the annular actuating surface 102 of the output piston 42. The other end of the annular chamber 124 is formed in part by the annular shoulder 54 and in part by the annular inner end 126, of the input-plunger piston 48.

Since, under the foregoing conditions, the annular chamber 124 is connected to the reservoir port 24, the springs 52 and 94 bias the input and output plungers 40 and 42 into their normal positions, as shown in FIG. 1 of the drawings.

If the clutch pedal 66 is actuated to displace the input plunger 40 toward the output end 18 of the cylinder 14, the spool valve 44 moves axially toward the output end of the cylinder relative to the output piston 42. Such relative axial movement results first in movement of the annular groove 114 out of fluid communication with the annular groove 118, and then results in movement of the annular groove 112 into fluid communication with the annular groove 118. Under these conditions, the annular chamber 124 is placed in fluid communication with the inlet port 20 so that the operating fluid at the pressure obtaining in the inlet port acts on the actuating surface 102 to displace the output piston 42 toward the output end 18 of the cylinder 14 to disengage the clutch 92. This set of conditions is shown in FIG. 2 of the drawings.

The movement of the input plunger 40 toward the output end 18 of the cylinder 14 under the influence of the clutch pedal 66 is limited by engagement of an annular stop 128 on the input means 62 with the input end 16 of the cylinder 14. Under these conditions, the clutch 92 is disengaged, but the overtravel designated by the dimensional arrows 100 has not yet occurred, this being discussed later herein.

It will be apparent that the foregoing action provides at the output means 74 an amplified booster output or output force which is larger than the manual input force applied to the input means 62 through the clutch pedal 66. It will also be apparent that since the operating fluid acts on the annular inner end 126 of the piston 48 of the input plunger 40, the operator is provided with the desired positive feel. The amount of feel fed back to the opeartor is determined by the ratio of the areas of the actuating surface 102 and the inner end 126 of the piston 48, since the operating fluid pressure is applied to both of these surfaces. Thus, the amount of boost achieved is equal to the product of the operating fluid pressure and the difference between the areas of the annular actuating surface 102 and the annular inner end 126 of the piston 48.

As previously outlined, the outlet port 22 of the booster valve 10 is constantly in communication with the inlet port 20 thereof with a variable restriction to flow from the inlet port 20 to the outlet port 22, so as to insure constant availability of operating fluid to the steering control valve 32, irrespective of whether the booster valve 10 is being operated to disengage the clutch 92 or not. To achieve this, the spool valve 44 is provided with radial ports 130 the inner ends of which communicate with the axial passage 108 in the spool valve and the outer ends of which communicate with an external annular groove 132 in the spool valve. The annular groove 132 is in constant, but variable, communication with an internal annular groove 134 in the output piston 42. The annular groove 134 communicates through radial ports 136 with a wide external annular channel 138 in the output piston 42, such annular channel being in constant fluid communication with the outlet port 22. Thus, operating fluid from the pump 26 can always reach the steering control valve 32 by way of the inlet port 20, the annular channel 104, the radial ports 106, the axial passage 108, the radial ports 130, the annular groove 132, the annular groove 134, the radial ports 136, the annular channel 138, the outlet port 22 of the booster valve 10, and the inlet port 30 of the steering control valve 32.

*Operation of Booster Valve 10*

As previously explained, if the clutch pedal 66 is actuated, with the parts in their normal positions as shown in FIG. 1 of the drawings, to move the input plunger 40 toward the output end 18 of the cylinder 14, the annular groove 114 in the spool valve 44 moves out of communication with the annular groove 118 in the output piston 42, and the annular groove 112 in the spool valve then moves into communication with the annular groove 118 in the output piston. This results in the delivery of operating fluid from the inlet port 20 to the annular chamber 124, whereupon the operating fluid, at the pressure obtaining in the inlet port 20, acts on the actuating surface 102 of the output piston to displace the output piston toward the output end 18 of the cylinder 14. This condition exists as long as the operator continues to depress the clutch pedal 66. Ultimately, the input plunger 40 reaches the limit of its travel, as shown in FIG. 2 of the drawings, wherein the annular stop 128 engages the input end 16 of the cylinder 14. By this time, the output piston 42 has reached the position shown in FIG. 2 of the drawings, wherein it has fully disengaged the clutch 92. In other words, the output piston 42 has moved through its normal travel distance, as indicated by the dimensional arrows 98 in FIG. 2 of the drawings.

It will be noted from FIG. 2 of the drawings that as the foregoing events transpired, the annular groove 132 in the spool valve 44 moved relative to the annular groove 134 in the output piston 42 into a position such as to provide an increased restriction to flow of the operating fluid from the inlet port 20 to the outlet port 22. This produced a back pressure in the operating fluid, upstream from the annular grooves 132 and 134, so as to provide sufficient operating fluid pressure in the annular chamber 124 to disengage the clutch 92. It will be noted from FIG. 2 of the drawings that the flow of operating fluid to the steering control valve 32 can never be completely cut off at the annular grooves 132 and 134 because the piston 48 of the input plunger 40 limits the travel of the output piston 42, relative to the input plunger 40, in a direction toward the output end 18 of the cylinder 14.

With the various components in the positions shown in FIG. 2 of the drawings, the booster valve 10 acts as a relief valve, the output piston 42 moving toward the output end 18 of the cylinder 14 in response to an increase in the operating fluid pressure in the annular chamber 124 to decrease the restriction to operating fluid flow from the inlet port 20 to the outlet port 22, thereby maintaining a substantially constant pressure in the annular chamber 124, and thus maintaining a substantially constant operator feel. A pressure decrease in the annular chamber 124 results in an increase in the restriction to operating fluid flow, again to maintain the pressure at 124 substantially constant.

In acting as a relief valve, the output piston 42 can never move far enough toward the input end 16 of the cylinder 14 to completely cut off operating fluid flow to the steering control valve 32 at the annular grooves 132 and 134 because, before this can occur, the output piston seats against the piston 48 of the input plunger 40, as shown in FIG. 2 of the drawings.

Thus, the output piston 42 constantly seeks an equilibrium position, but can never interrupt the supply of operating fluid to the steering control valve 32. It will be noted that the foregoing relief valve action of the output piston 42 is possible because of the overtravel designated by the dimensional arrows 100, inherent in the clutch 92.

When the steering control valve 32 is actuated to steer the vehicle, a back pressure is developed which increases the pressure of the operating fluid in the annular chamber 124 so as to cause the output piston 42 to move toward the output end 18 of the cylinder 14, this being permitted by the overtravel 100. Ultimately, such movement of the output piston 42 results in movement of the annular groove 118 in the output piston just out of communication with the annular groove 112 in the spool valve 44, whereby the movement of the output piston toward the output end 18 of the cylinder 14 is terminated. Also, this prevents an increased pressure force feed back to the clutch pedal 66 tending to move the clutch pedal against the pressure of the operator's foot.

The foregoing movement of the output piston 42 toward the output end 18 of the cylinder 14 has the further effect of moving the annular groove 134 more nearly into register with the annular groove 132 as compared to the conditions previously obtaining and shown in FIG. 2 of the drawings. Consequently, the back pressure produced by the restriction at the annular grooves 132 and 134 is limited, and an ample supply of operating fluid to the fluid operated steering system is assured, even though the booster valve 10 is simultaneously being used to disengage the clutch 92. Actually, virtually all of the output of the pump 26 is available for the power steering system under such conditions, only a very small portion of the pump output being required to disengage the clutch 92.

The fluid operated booster valve 10 of the invention operates in a similar manner under other conditions. For example, if it is necessary to operate the steering system with the parts of the booster valve 10 in the positions shown in FIG. 1, the output of the pump 26 passes freely to the steering control valve 32, steering under such conditions having no effect on the operation of the booster valve. On the other hand, if clutch disengagement is required while steering, only a small portion of the output of the pump 26 is diverted to the annular chamber 124 to displace the output piston 42 toward the output end 18 of the cylinder 14. The input plunger 40 and the output piston 42 move toward the output end of the cylinder substantially concurrently under such conditions, with a slight lag by the output piston 42 to permit the delivery of operating fluid under pressure to the annular chamber 124, so that the operation of the steering system is substantially unaffected.

It will be apparent that when re-engagement of the clutch 92 is desired, the operator merely releases the clutch pedal 66, whereupon the spring 94, and the spring 52, return the output piston 42 and the input plunger 40 to their normal positions. More particularly, when the clutch pedal 66 is released, the spring 52 moves the input plunger 40 toward the input end 16 of the cylinder 14, thereby moving the annular groove 112 out of communication with the annular groove 118 and moving the annular groove 114 into communcation with the annular groove 118. Under these conditions, fluid will flow from the annular chamber 124 to the reservoir 28. The clutch spring 94 causes the output piston 42 to follow the input plunger 40 when this occurs until, ultimately, the parts are restored to their normal positions, as shown in FIG. 1 of the drawings.

*Booster Valve 140*

Figures 4, 5:
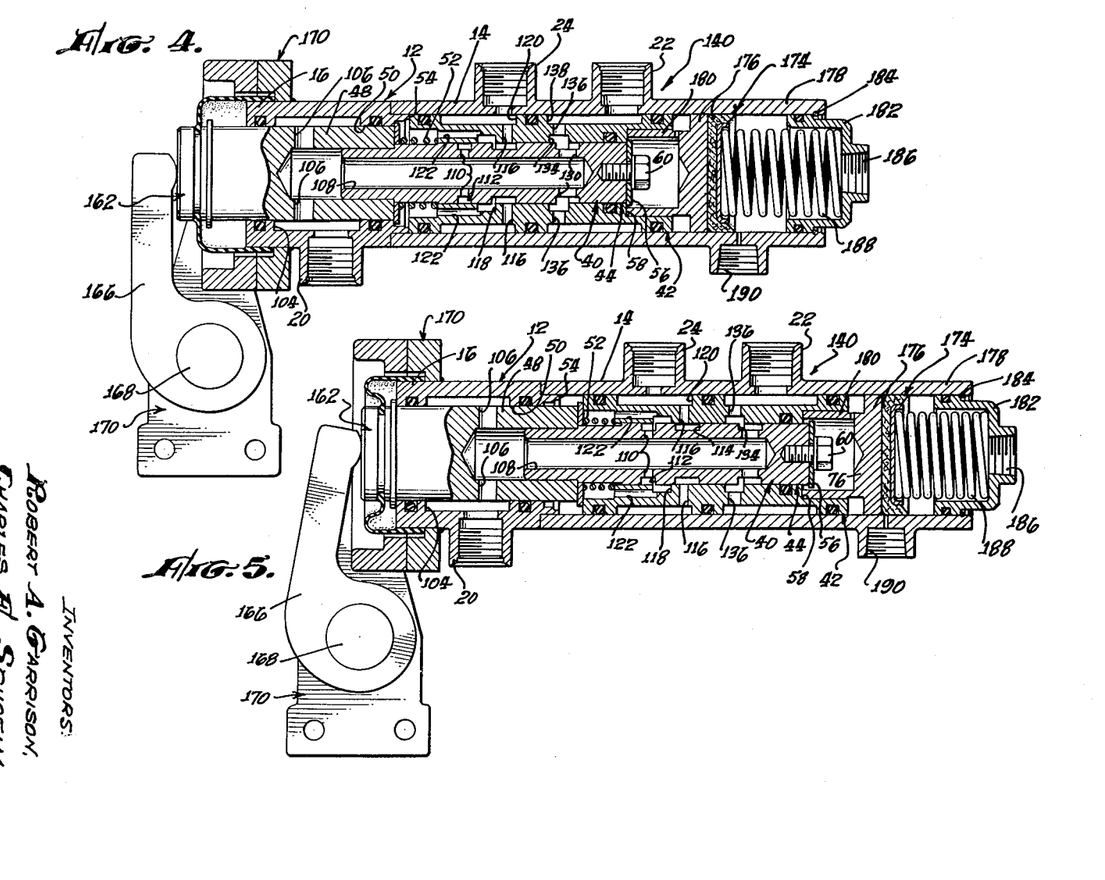
FIG. 4 is a longitudinal sectional view of another embodiment of the fluid operated booster valve of the invention.
FIG. 5 is a longitudinal sectional view similar to FIG. 4, but showing a different set of operating conditions.

Turning now to FIGS. 4 and 5 of the drawings, illustrated therein is a booster valve 140 the structure and mode of operation of which are identical in most respects to those of the booster valve 10. Consequently, identical reference numerals are applied wherever applicable and only the differences will be considered in detail.

One minor difference is that the booster valve 140 is provided with an input means 162 differing from the input means 62 in the omission of the stem 64. The input means 162 is formed entirely by a projecting portion of the piston 48 of the input plunger 40. Bearing against the outer, projecting end of the piston 48 is a lever 166 fixed on a shaft 168 to which a clutch pedal, not shown, may be connected. The shaft 168 is rotatably mounted on a support 170 which carries the booster valve 140.

The principal difference between the booster valves 10 and 140 is that the former is provided with the mechanical output means 74, whereas the latter is provided with a hydraulic output means 174. This hydraulic output means comprises a piston 176 operating in an extension 178 of the output end 18 of the cylinder 14, the piston 176 having a reduced-diameter portion 180 inserted into the output piston 42 and seated against the annular shoulder 58 thereof. While the pistons 42 and 176 are shown as separate parts, they may be integral. However, they are preferably formed separately so that the output piston 42 may be used with either the booster valve 10 or the booster valve 140.

The outer end of the extension 178 of the output end 18 of the cylinder 14 is closed by a closure 182 which is retained by a snap ring 184 and which is provided with a second outlet or working port 186 connectible to a fluid operated apparatus, such as a clutch, not shown, adapted to be disengaged by a fluid motor, not shown, of the reciprocating type.

It will be apparent that the operation of the booster valve 140 is very similar to that of the booster valve 10, the only difference being that the booster output, instead of being mechanical, takes the form of fluid displacement by the piston 176 out through the working port 186. Consequently, a further description is unnecessary.

Interposed between the piston 176 and the closure 182 is a resilient means for biasing the output piston 42 toward the input end 16 of the cylinder 14, such resilient means comprising a compression coil spring 188 seated on the piston 76 and the closure 182. The spring 188 serves the function of tending to return the output piston 42 to its normal position.

The extension 178 of the output end 18 of the cylinder 14 is provided therein with a port 190 which communicates with the space betwen the piston 176 and the closure 182 when the output piston 42 is in its normal position, but which is cut off by the piston 176 when the booster valve 140 is operated, as shown in FIG. 5 of the drawings. The port 190 may be connected to any suitable source of operating fluid for the hydraulic output means 174, the operating fluid being either the same as or different from the operating fluid utilized in the steering system. For example, if the booster valve 140 is utilized to operate a hydraulic brake system, the port 190 may be connected to a conventional master-cylinder type reservoir, not shown.

Booster Valve 210

Figure 6:
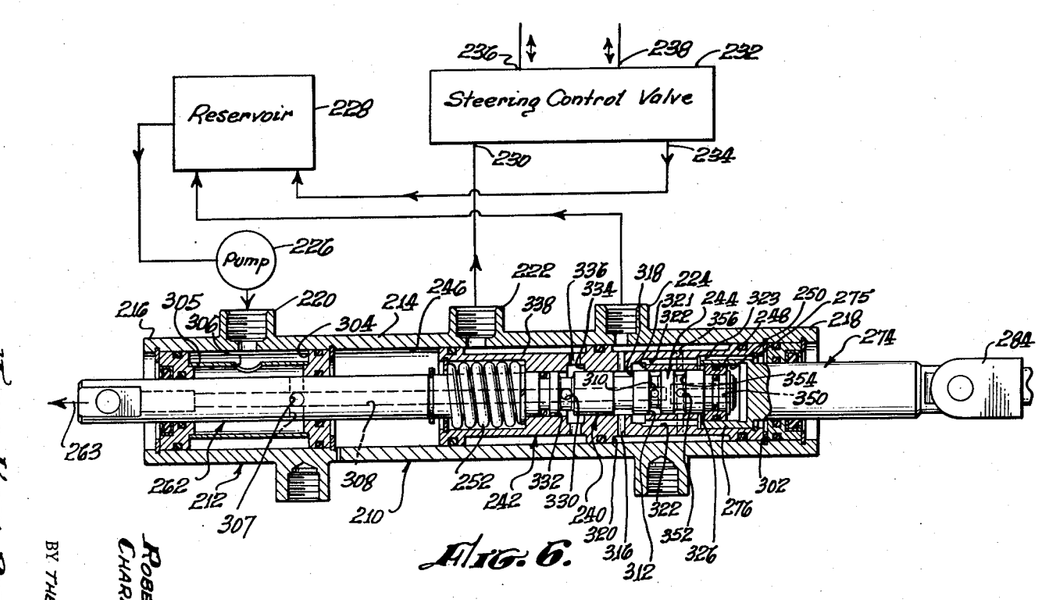
FIG. 6 is a view similar to FIG. 1, but illustrating still another embodiment of the invention.
Figure 7:
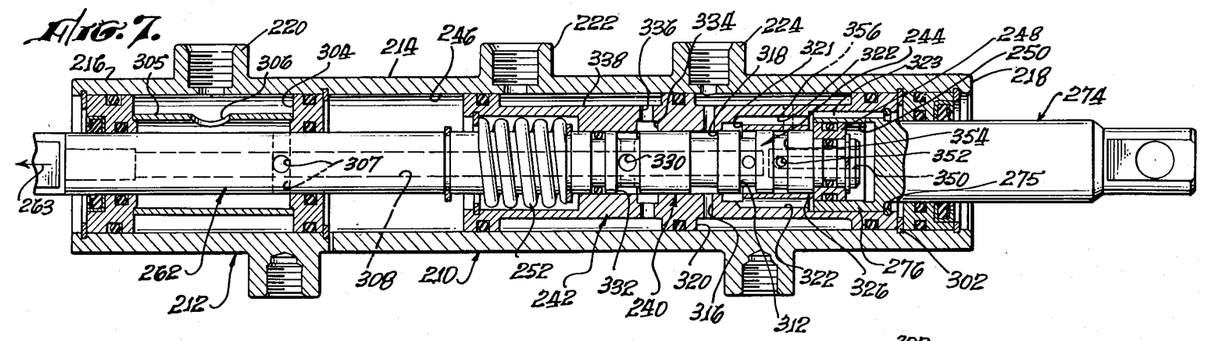
FIGS. 7 and 8 are views similar to FIG. 6, but showing different sets of operating conditions.
Figure 8:
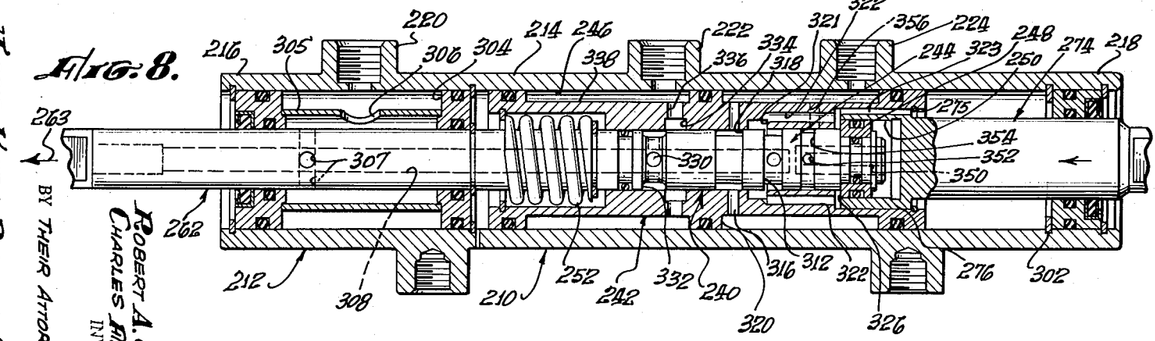

Referring now to FIGS. 6 to 8 of the drawings, illustrated therein is a booster valve 210 which is similar to the booster valve 10 in most respects. The principal difference between the booster valves 10 and 210 is that the former operates with a "pushing" action, whereas the latter has a "pulling" action. In other words, the booster valve 10 accepts a "push" input to produce a "push" mechanical output, whereas the booster valve 210 accepts a "pull" input to produce a "pull" mechanical output.

In view of the similarity of the booster valve 210 to the booster valve 10, those components of the booster valve 210 which have their counterparts in the booster valve 10 will not be described in detail, but will merely be designated by reference numerals higher by two hundred than the reference numerals used to designate the corresponding parts of the booster valve 10.

Thus, the booster valve 210 includes a housing 212 provided with a cylinder 214 having input and output ends 216 and 218 and having therein an inlet port 220 connected to a pump 226, an outlet or working port 222 connected to a steering control valve 232, and a reservoir port 224 connected to a reservoir 228. The various interconnections between the pump 226, the reservoir 228 and the steering control valve 232 will be apparent from FIG. 6 of the drawings, being identical to those of FIG. 1 of the drawings.

The booster valve 210 includes concentric, relatively axially movable, input and output plungers 240 and 242 within the cylinder 214. The input plunger 240 includes a spool valve 244 disposed within the output plunger 242, the latter being a sleeve-type piston. The output plunger 242 is reciprocable in a major-diameter portion 246 of the cylinder 214. The input plunger 240 includes a piston 248 which is reciprocable in a cylinder 250 formed, in this instance, in a head 276 of an axially movable, tensionable output means 274. The latter has pivotally connected thereto a tensionable link 284 leading to a clutch, not shown, or other device, to be actuated. As previously explained, the device to be actuated is capable of overtravel and incorporates a spring, not shown, such as spring 94 of FIG. 1. Such spring biases the output means 274 toward the output end 218 of the cylinder 214. This biasing force is transmitted to the output plunger 242 by a lock ring 275.

The input plunger 240 is biased toward the output end 218 of the cylinder 214 by a compression coil spring 252 seated against snap rings, not specifically identified, carried by the input and output plungers 240 and 242. Thus, the various parts are biased toward the positions shown in FIG. 6 of the drawings.

Formed integrally with the input plunger 240 in the particular construction illustrated is an axially movable, tensionable input means 262 adapted to have an axial pull force applied thereto, as indicated by the arrow 263. The input means 262 may be connected to a clutch pedal, or the like, not shown, in much the same manner as the input means 62 of the booster valve 10.

The various passages, ports, and the like, in the input and output plungers 240 and 242 will be considered in the next section of this specification in conjunction with a description of the operation of the booster valve 210.

Operation of Booster Valve 210

Except for the fact that the input means 262 accepts a pull input to produce a pull output at the output means 274, the operation of the booster valve 210 is substantially identical to that of the booster valve 10, the interaction between the spool valve 244 and the output plunger 242 being substantially identical. Consequently, only a brief description is necessary.

The inlet port 220 is in constant communication with the working port 222, to deliver operating fluid under pressure discharged by the pump 226 to the steering control valve 232, through an interconnecting passage means which includes: an annular channel 304 formed in the housing 212 and divided into two radially spaced parts by a partition sleeve 305 having a port 306 therein; radial ports 307 in the input means 262 leading to an axial passage 308 formed in the input means and extending into the spool valve 244; radial ports 330 in the spool valve; and external annular groove 332 in the spool valve; an internal annular groove 334 in the output plunger 242; radial ports 336 in the output plunger; and an external annular channel 338 in the output plunger, this annular channel being in constant communication with the working port 222.

When the booster valve 210 is not being actuated to operate a clutch, or the like, the annular groove 332 in the spool valve 244 is in full communication with the annular groove 334 in the output plunger 242. Under such conditions, which are shown in FIG. 6 of the drawings, there is no restriction of the flow from the pump 226 to the steering control valve 232. However, when the booster valve 210 is actuated by a pull force applied to the input means 262, the spool valve 244 moves axially relative to the output plunger 242 to provide restricted communication between the annular grooves 332 and 334, as shown in FIGS. 7 and 8 of the drawings. As explained in connection with the description of the operation of the booster valve 10, this provides sufficient back pressure to permit the booster valve 210 to operate a clutch, or the like, without, however, starving the steering control valve 232.

The output plunger 242 is provided with an annular actuating surface 302 which faces axially of the cylinder 214 toward the output end 218 thereof. Normally, the actuating surface 302 is exposed to reservoir pressure. However, when the booster valve 210 is actuated, the actuating surface 302 is exposed to pump pressure. The manner in which this is accomplished will now be considered.

Referring to FIG. 6 of the drawings, when the booster valve 210 is unactuated, the reservoir port 224 is connected to the actuating surface 302 of the output plunger 242 by an interconnecting passage means which includes: an external annular channel 320 in the output plunger 242; radial ports 316 in the output plunger; an external annular groove 318 in the spool valve 244; an internal annular groove 321 in the output plunger; longitudinal passages 322 in the output plunger; and external longitudinal grooves 323 (only one of which is shown) in the head 276 of the output means 274.

However, when the booster valve 210 is actuated by a pull force applied to the input means 262, the spool valve 244 moves axially relative to the output plunger 242 slightly to cut off communication between the annular groove 318 in the spool valve and the annular groove 321 in the output plunger. Such relative axial movement of the spool valve 244 and the output plunger 242 also places the annular groove 321 in communication with an external annular groove 312 in the spool valve, this annular groove communicating through radial ports 310 with the axial passage 308 leading to the pump 226. Consequently, under the conditions shown in FIGS. 7 and 8 of the drawings, the back pressure produced by the previously-described restriction at the annular grooves 332 and 334 is applied, through the annular groove 321, the passages 322 and the grooves 323, to the annular actuating surface 302 so as to produce the desired boosting effect. In this instance, the boosting effect is manifested as a pull force applied to the output means 274.

The passages 322 in the output plunger 242 also communicate with the interior of the cylinder 250 to apply the aforementioned back pressure to an annular area 326 of the piston 248 which faces axially toward the input end 216 of the cylinder 214. The pressure so applied to the annular area 326 acts to oppose the pull input force applied to the input means 262 to provide a "feel" proportional to the pull output force applied to the output means 274. As previously explained in connection with the booster valve 10, the amount of feel fed back to the operator is determined by the ratio of the area of the actuating surface 102 to the piston area 326.

In order to prevent a fluid lock, it is necessary to vent the inner end of the cylinder 250, i.e., the end of the cylinder 250 which is on the opposite side of the piston 248 from the piston area 326, to the reservoir 228. This is accomplished by a passage means which includes: an axial passage 350 extending into the spool valve 244, radial ports 352 in the spool valve, an external annular groove 354 in the spool valve, and radial ports 356 in the output plunger which communicate at their outer ends with the annular channel 320 therein, and which are so located that their inner ends always communicate with the annular groove 354 in the spool valve for all relative positions of the spool valve and the output plunger.

The foregoing completes a description of the details of the fluid flow through the booster valve 210 when the booster valve is not actuated, and when it is actuated. The over-all operation of the booster valve 210, as previously indicated, is the same as the over-all operation of the booster valve 10, except for the fact that the input means 262 accepts a pull input to provide a pull output at the output means 274, instead of accepting a push input to produce a push output. Consequently, a further description of the over-all operation of the booster valve 210 is not necessary.

Although exemplary embodiments of the invention have been disclosed herein for purposes of illustration, it will be understood that various changes, modifications and substitutions may be incorporated in such embodiments without departing from the spirit of the invention as defined by the claims which follow.

We claim:

1. In a fluid operated booster valve for use with two apparatuses at least one of which is fluid operated, the combination of:
   (a) a housing providing a cylinder having input and output ends and having therein an inlet port connectible to a source of operating fluid, an outlet port connectible to said one apparatus to deliver operating fluid thereto, and a reservoir port connectible to a reservoir;
   (b) relatively axially movable, input and output plungers axially movable in said cylinder, said output plunger having an actuating surface which faces axially of said cylinder;
   (c) tensionable input means adjacent said input end of said cylinder and connected to said input plunger for pulling said input plunger axially of said cylinder relative to said output plunger;
   (d) tensionable output means adjacent said output end of said cylinder and connected to said output plunger, said output means being connectible to the other of said apparatuses and being movable with said output plunger to actuate said other apparatus when fluid pressure from said inlet port is applied to said actuating surface;
   (e) means for biasing said input and output plungers axially of said cylinder in opposition to the action of fluid pressure from said inlet port on said actuating surface;
   (f) means including first valve means embodied in said input and output plungers and responsive to relative axial movement thereof for selectively connecting said actuating surface in fluid communication with said reservoir port and with said inlet port; and
   (g) means including second valve means embodied in said input and output plungers and responsive to relative axial movement thereof for connecting said inlet port and said outlet port in fluid communication and for controlling the restriction to flow of operating fluid from said inlet port to said outlet port.

2. In a fluid operated booster valve for use with two apparatuses at least one of which is fluid operated, the combination of:
   (a) a housing providing a cylinder having input and output ends and having therein an inlet port connectible to a source of operating fluid, an outlet port connectible to said one apparatus to deliver operating fluid thereto, and a reservoir port conectible to a reservoir;
   (b) concentric, relatively axially movable, input and output plungers axially movable in said cylinder, said input plunger being within said output plunger and said output plunger having at one end thereof an annular actuating surface which faces axially of said cylinder;
   (c) tensionable input means adjacent said input end of said cylinder and connected to said input plunger for pulling said input plunger axially of said cvlinder relative to said output plunger;
   (d) tensionable output means adjacent said output end of said cylinder and connected to the other end of said output plunger, said output means being connectible to the other of said apparatuses and being movable with said output plunger to actuate said other apparatus when fluid pressure from said inlet port is applied to said actuating surface;
   (e) means for biasing said input and output plungers axially of said cylinder in opposition to the action of fluid pressure from said inlet port on said actuating surface;
   (f) means including first valve means embodied in said input and output plunger and responsive to relative axial movement thereof for selectively connecting said actuating surface in fluid communication with said reservoir port and with said inlet port; and
   (g) means including second valve means embodied in said input and output plungers and responsive to relative axial movement thereof for connecting said inlet port and said outlet port in fluid communication and for controlling the restriction to flow of operating fluid from said inlet port to said outlet port.

3. In a fluid operated booster valve for use with two apparatuses at least one of which is fluid operated, the combination of:
   (a) a housing providing a cylinder having input and output ends and having therein an inlet port connectible to a source of operating fluid, an outlet port connectible to said one apparatus to deliver operating fluid thereto, and a reservoir port connectible to a reservoir;
   (b) concentric, relatively axially movable, input and output plungers axially movable in said cylinder, said input plunger being within said output plunger and said output plunger having at one end thereof an annular actuating surface which faces axially of said cylinder toward said output end thereof;
   (c) tensionable input means adjacent said input end of said cylinder and connected to said input plunger for pulling said input plunger axially of said cylinder relative to said output plunger;
   (d) tensionable output means adjacent said output end of said cylinder and connected to the other end of said output plunger, said output means being connectible to the other of said apparatuses and being movable with said output plunger to actuate said other apparatus when fluid pressure from said inlet port is applied to said actuating surface;
   (e) means for biasing said input and output plungers axially of said cylinder in opposition to the action of fluid pressure from said inlet port on said actuating surface;
   (f) means including first valve means embodied in said input and output plungers and responsive to relative axial movement thereof for selectively connecting said actuating surface in fluid communication with said reservoir port and with said inlet port; and (g) means including second valve means embodied in said input and output plungers and responsive to relative axial movement thereof for connecting said inlet port and said outlet port in fluid communication and for controlling the restriction to flow of operating fluid from said inlet port to said outlet port.

4. In a fluid operated booster valve for use with two apparatuses at least one of which is fluid operated, the combination of:

(a) a housing providing a cylinder having input and output ends and having therein an inlet port connectible to a source of operating fluid, an outlet port connectible to said one apparatus to deliver operating fluid thereto, and a reservoir port connectible to a reservoir;

(b) concentric, relatively axially movable, input and output plungers axially movable in said cylinder and providing therein passage means interconnecting said inlet port and said outlet port, said input plunger being within said output plunger and said output plunger having at one end thereof an annular actuating surface which faces axially of said cylinder toward said output end thereof;

(c) tensionable input means adjacent said input end of said cylinder and connected to said input plunger for pulling said input plunger axially of said cylinder relative to said output plunger;

(d) tensionable output means adjacent said output end of said cylinder and connected to the other end of said output plunger, said output means being connectible to the other of said apparatuses and being movable with said output plunger to actuate said other apparatus when fluid pressure from said inlet port is applied to said actuating surface;

(e) means for biasing said input and output plungers axially of said cylinder in opposition to the action of fluid pressure from said inlet port on said actuating surface; and (f) control means including valve means embodied in said input and output plungers and responsive to relative axial movement thereof for selectively connecting said actuating surface of said output plunger in fluid communication with said reservoir port and with said inlet port and for controlling the restriction to flow of operating fluid from said inlet port to said outlet port by way of said passage means in said input and output plungers, said control means including means for increasing the restriction to flow of operating fluid through said passage means when said actuating surface of said output plunger is in fluid communication with said inlet port and the fluid pressure in said outlet port is low, and for decreasing the restriction to flow of operating fluid through said passage means when said actuating surface of said output plunger is in fluid communication with said inlet port and the fluid pressure in said outlet port is high.

5. In a fluid operated booster valve for use with two apparatuses at least one of which is fluid operated, the combination of:

(a) a housing providing a cylinder having input and output ends and having therein an inlet port connectible to a source of operating fluid, an outlet port connectible to said one apparatus to deliver operating fluid thereto, and a reservoir port connectible to a reservoir;

(b) concentric, relatively axially movable, input and output plungers axially movable in said cylinder, said input plunger being within said output plunger and said output plunger having at one end thereof an annular actuating surface which faces axially of said cylinder toward said output end thereof;

(c) tensionable input means adjacent said input end of said cylinder and connected to said input plunger for pulling said input plunger axially of said cylinder relative to said output plunger;

(d) tensionable output means adjacent said output end of said cylinder and connected to the other end of said output plunger, said output means being connectible to the other of said apparatuses and being movable with said output plunger to actuate said other apparatus when fluid pressure from said inlet port is applied to said actuating surface;

(e) means for biasing said input and output plungers axially of said cylinder in opposition to the action of fluid pressure from said inlet port on said actuating surface; and (f) cntrol means embodied in said input and output plungers and responsive to relative axial movement thereof for selectively connecting said actuating surface of said output plunger in fluid communication with said reservoir port and with said inlet port and variably connecting said outlet port in fluid communication with said inlet port.

6. In a fluid operated booster valve for use with two apparatuses at least one of which is fluid operated, the combination of:

(a) a housing providing a cylinder having input and output ends and having therein an inlet port connectible to a source of operating fluid, an outlet port connectible to said one apparatus to deliver operating fluid thereto, and a reservoir port connectible to a reservoir;

(b) concentric, relatively axially movable, input and output plungers axially movable in said cylinder, said input plunger being within said output plunger and said output plunger having at one end thereof an annular actuating surface which faces axially of said cylinder toward said output end thereof;

(c) tensionable input means adjacent said input end of said cylinder and connected to said input plunger for pulling said input plunger axially of said cylinder relative to said output plunger;

(d) tensionable output means adjacent said output end of said cylinder and connected to the other end of said output plunger for actuating said other apparatus when fluid pressure from said inlet port is applied to said actuating surface;

(e) means for biasing said input and output plungers axially of said cylinder in opposition to the action of fluid pressure from said inlet port on said actuating surface; and (f) control means embodied in said input and output plungers and responsive to relative axial movement thereof for selectively connecting said actuating surface of said output plunger in fluid communication with said reservoir port and with said inlet port and for variably connecting said outlet port in fluid communication with said inlet port.

7. In a fluid operated booster valve for use with two apparatuses at least one of which is fluid operated, the combination of:

(a) a housing providing a cylinder having input and output ends and having therein an inlet port connectible to a source of operating fluid, an outlet port connectible to said one apparatus to deliver operating fluid thereto, and a reservoir port connectible to a reservoir;

(b) concentric, relatively axially movable, input and output plungers axially movable in said cylinder, said input plunger being within said output plunger and said output plunger having at one end thereof an annular actuating surface which faces axially of said cylinder toward said output end thereof;

(c) tensionable input means adjacent said input end of said cylinder and connected to said input plunger for pulling said input plunger axially of said cylinder relative to said output plunger;

(d) tensionable output means adjacent said output end of said cylinder and connected to the other end of said output plunger, said output means including means for mechanically connecting said output plunger to the other of said apparatuses and being movable with said output plunger to actuate said other apparatus when fluid pressure from said inlet port is applied to said actuating surface;

(e) means for biasing said input and output plungers axially of said cylinder in opposition to the action of fluid pressure from said inlet port on said actuating surface; and (f) control means embodied in said input and output plungers and responsive to relative axial movement thereof for selectively connecting said actuating surface of said output plunger in fluid communication with said reservoir port and with said inlet port and for variably connecting said outlet port in fluid communication with said inlet port.

References Cited in the file of this patent

UNITED STATES PATENTS

| 1,848,923 | Almen | Mar. 8, 1932 |
| 2,434,538 | Baston | Jan. 13, 1948 |
| 3,045,651 | Ljunggren | July 24, 1962 |

FOREIGN PATENTS

| 424,653 | Italy | Aug. 28, 1947 |